L. M. BUCHANAN.
TRACTOR.
APPLICATION FILED JAN. 2, 1915.
1,198,698.
Patented Sept. 19, 1916.
3 SHEETS—SHEET 2.
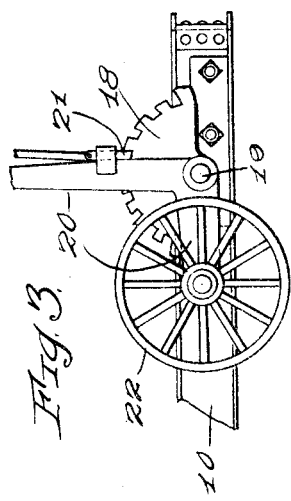
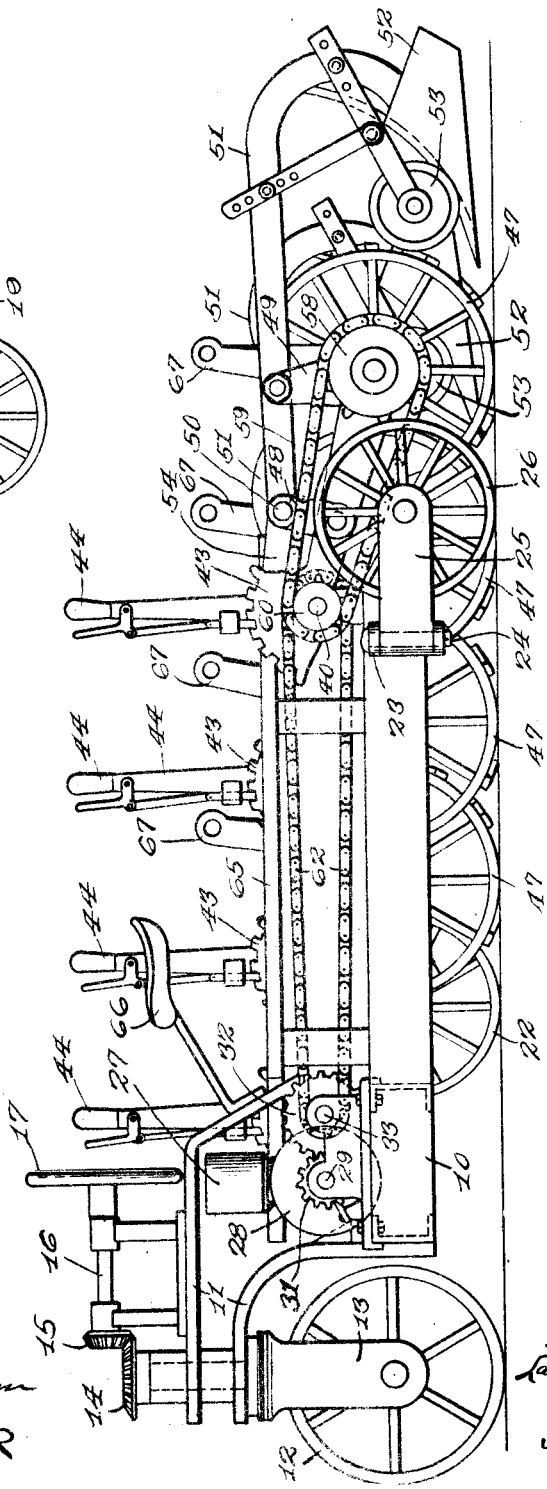
WITNESSES:
L. B. Graham
M. H. DeBusk
INVENTOR:
Laughlin M. Buchanan
By
Adams & Jackson
Attys L. M. BUCHANAN.
TRACTOR.
APPLICATION FILED JAN. 2, 1915.
1,198,698.
Patented Sept. 19, 1916.
3 SHEETS—SHEET 3.
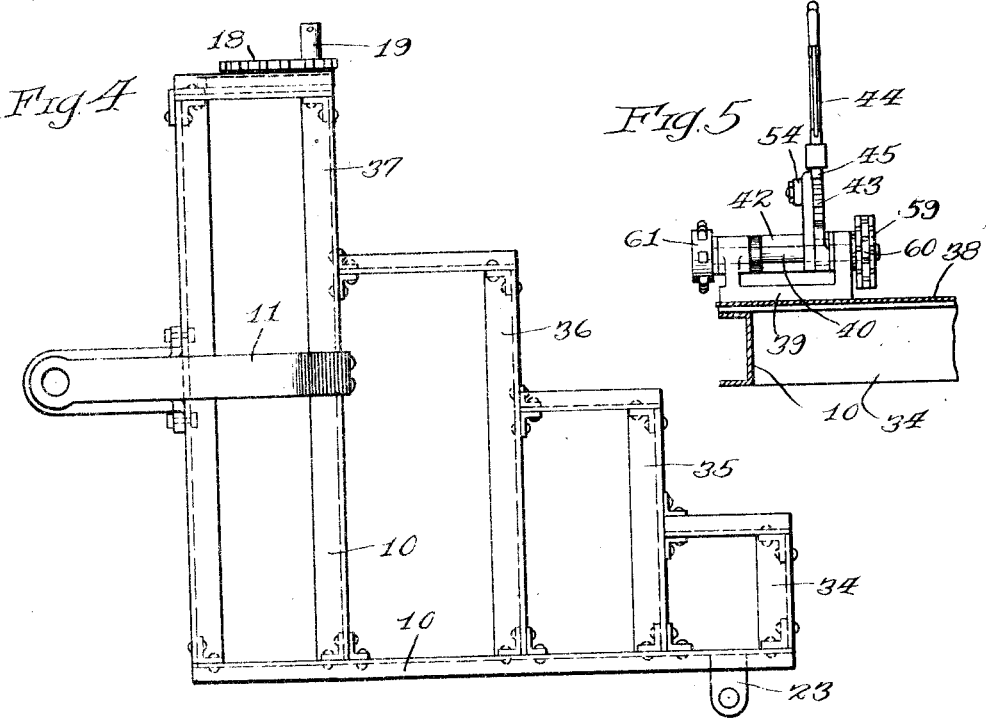
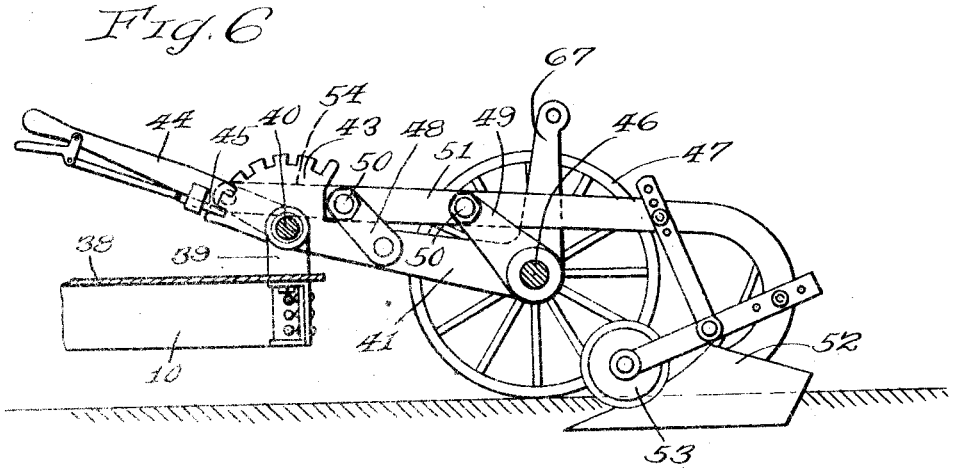
WITNESSES:
L. B. Graham
M. H. DeBusk
INVENTOR:
Laughlin M. Buchanan
By Adams & Jackson
Attys.

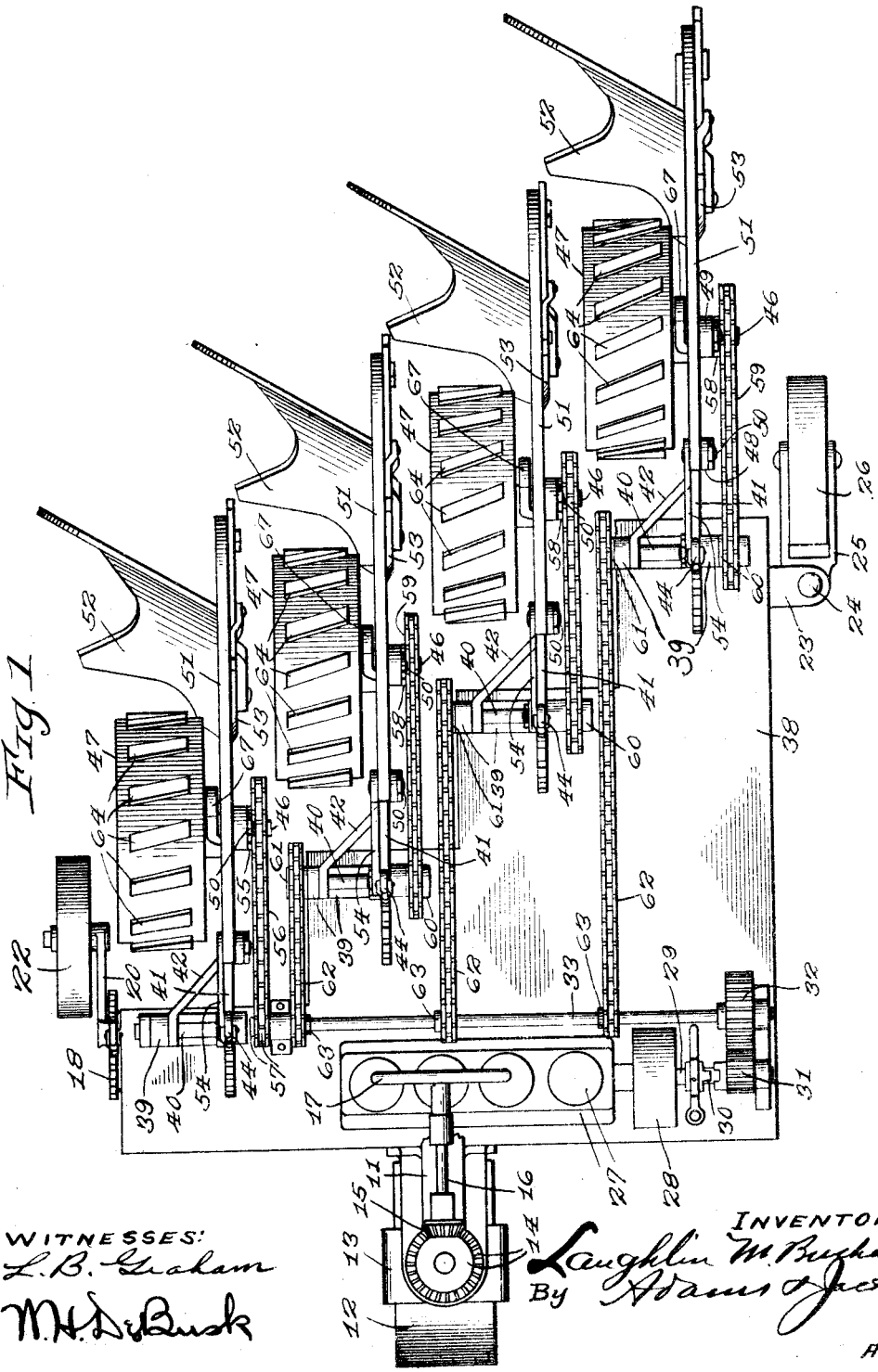

UNITED STATES PATENT OFFICE.

LAUGHLIN M. BUCHANAN, OF KEWANEE, ILLINOIS.

TRACTOR.

1,198,698.　　　　　Specification of Letters Patent.　　Patented Sept. 19, 1916.

Application filed January 2, 1915. Serial No. 243.

*To all whom it may concern:*

Be it known that I, LAUGHLIN M. BUCHANAN, a citizen of the United States, residing at Kewanee, in the county of Henry and State of Illinois, have invented certain new and useful Improvements in Tractors, of which the following is a specification, reference being had to the accompanying drawings.

This invention relates to tractors and especially to a tractor for plowing purposes adapted to have a gang of plows attached directly thereto, and it has for its object the provision of a new and improved form and arrangement of driving members by which improved traction may be attained. Heretofore it has been thought necessary to provide a heavy construction of tractor in order to obtain the requisite grip upon the ground being traversed to provide proper traction for plowing.

It is one of the objects of my invention to provide a form and arrangement such that a tractor of comparatively light construction may be able to progress with a proper grip upon the earth to enable the tractor to draw the desired number of plows.

It is another object of my invention to provide a comparatively light structure, such as that just described, in which the force tending to hold the plow as a whole in proper engagement with the ground varies according to the number of shares operated, and according to the depth at which the plow shares run.

It is another object of my invention to improve traction gang plows in sundry details hereinafter pointed out.

The preferred means by which I have accomplished the objects of my invention are illustrated in the accompanying drawings and are hereinafter specifically described. That which I believe to be new is set forth in the claims.

In the drawings:—Figure 1 is a top or plan view of a traction gang plow embodying the preferred form of my improved construction; Fig. 2 is a side view of the machine shown in Fig. 1; Fig. 3 is a view showing the means for adjustably mounting the gage-wheel at the forward end of the plow frame at one side thereof; Fig. 4 is a plan view of the framework of the machine; Fig. 5 is a detailed view showing the connections between the plow-beams and the frame; and Fig. 6 is a side view showing a portion of the framework with one of the plows and coöperating parts attached thereto.

Referring to the several figures of the drawings in which corresponding parts are indicated by the same reference characters, 10 indicates the main framework of the machine comprising a bracket 11 of any suitable type projecting from its forward end, in which bracket 11 is revolubly mounted a supporting and guiding wheel 12 by means of a yoke 13. Upon the upper end of the yoke 13 above the bracket 11 is fixed a bevel-gear 14 meshing with another bevel-gear 15 fixed upon the forward end of a shaft 16 journaled upon the bracket 11. Fixed upon the rear end of the shaft 16 is a hand-wheel 17 by which the said shaft is adapted to be rotated for guiding purposes, as will be readily understood. Upon the forward right-hand portion of the frame 10, as viewed from the rear, is mounted a segmental rack 18 having a pin 19 projecting laterally therefrom, upon which pin 19 (see Fig. 3) is journaled a bell crank lever 20 adapted to be held in adjusted position relative to the segment 18 by means of a latch-dog 21 of any approved type. Upon the rear end of the bell crank lever 20 there is journaled a gage wheel 22. Laterally extending from the rear end of the frame 10 is a bracket 23 in which is pivotally mounted, by means of a pin 24, a yoke 25 having journaled therein a caster wheel 26. Mounted upon the forward end of the framework 10 is a motor 27, which, in the construction shown, is in the form of an internal combustion engine of any suitable type, provided with a fly-wheel 28 and having its crank shaft 29 adapted to be connected by means of any suitable clutch 30 with a driving pinion 31 which meshes with a gear 32 mounted upon a shaft 33 journaled in any suitable manner upon the frame 10. Inasmuch as the parts so far described form in and of themselves no part of my present invention it is not believed to be necessary to further describe them herein.

As best shown in Fig. 4, each of the transversely-extending bars 34, 35, 36 and 37 of the framework 10 is shorter than the one of said bars immediately in advance, there being provided in this way suitable mounts for the separate plows, as hereinafter described. Mounted upon the framework 10 is a deck 38 of any suitable type. Mounted upon the deck 38 above the bars 34—35—36—37 are a plurality of brackets 39. In the upturned ends of each of the brackets 39 is mounted a short shaft 40, each of which shafts 40 is arranged parallel with the shaft 33 with the exception of the forward one of said shafts, which is in alinement with said shaft 33. Each of said shafts 40 serves as a pivot-pin for connecting to the frame a draft-bar 41, which draft-bar 41 is reinforced at its forward end by a diagonally-extending brace-bar 42 also journaled upon said shaft. Mounted upon the forward end of the draft-bar 41 is a segmental rack 43, in the construction shown said rack being formed integrally with said bar. Pivotally mounted upon each of the shafts 40 adjacent to the rack-bar 43 is a lever 44 adapted to be held by means of a latch-dog 45, of any suitable type, in any desired adjusted position relative to said rack. Journaled upon the rear end of each of the draft-bars 41 by means of a shaft 46 is a wheel 47 adapted to support the rear end of the said draft-bar 41. Pivotally mounted upon each of the draft-bars 41 intermediate of its ends is a short link 48, and pivotally mounted upon the shaft or axle 46 is a slightly longer link 49. Pivotally mounted by means of bolts 50 upon the upper ends of the bars or arms 48—49 carried by each of the draft-bars 41 is a plow-beam 51 carrying at its lower rear end a plow-share 52 of any approved type and having adjustably mounted thereon in any suitable manner a colter 53. Pivotally connected to the forward end of each of the plow-beams 51 is a link 54, the forward end of each of which is pivotally connected to the corresponding one of the levers 44. As will be readily understood, by means of the lever 44 the plow beams 51 can be moved forward and back relative to the draft-bars 41, a forward movement of the lever 44 serving to lower the plow-share relative to the wheel 47 and a movement of the lever 44 to the rear serving to raise the plow share relative to such ground wheel.

As is clearly shown in Fig. 1, the shaft 46 of the ground wheel 47 of the foremost one of the plows 52 has fixed upon it so as to rotate with said ground wheel a sprocket-gear 55 adapted to be driven by a sprocket-chain 56 driven by a sprocket-gear 57 mounted upon the shaft 33. Each of the other shafts 46 has mounted upon it so as to rotate with the corresponding ground wheel 47 a sprocket-gear 58 connected by means of a sprocket-chain 59 with a sprocket-gear 60 fixed upon one end of the corresponding one of the shafts 40. The other end of each of said shafts 40 has fixed upon it a sprocket-gear 61, each of which is connected by means of a sprocket-chain 62 with a sprocket-gear 63 mounted upon the shaft 33. The proportions of the various sprocket-gears are such that all of the ground-wheels 47 are driven at the same rate of rotation, as will be readily understood.

By a proper manipulation of the levers 44 the plows 52 may be raised upon their respective ground-wheels 47, as is shown in Fig. 2, or they may be lowered more or less relative to the ground wheels so as to run at the desired depth below the surface, as shown in Fig. 6, the wheels 47 serving as gage-wheels for this purpose. As will be appreciated, the plows 52, by reason of being supported independently of each other by separate ground wheels will be enabled to follow the contour of the ground very readily. At the same time such ground wheels serve as the means for driving the plow, such ground wheels 47 being provided with diagonally-disposed cleats 64 for preventing the wheels from slipping on the surface of the ground. As will be appreciated from an inspection of Fig. 1, the cleats 64 are so disposed as to have a tendency to resist any lateral movement of the shares 52 to the left, as viewed from the rear.

It will be seen that in the operation of the machine for plowing purposes, the drive-wheels 47 will be held in proper engagement with the ground for traction purposes by the shares 52 working in the ground. It will be appreciated that, as the levers 44 are swung forward for increasing the depth of plowing thus making necessary additional traction power for drawing the plows through the ground, the force with which the ground wheels are held in contact with the ground is correspondingly increased. In other words, without in any way unnecessarily increasing the weight of the tractor the force of the engagement of the driving wheels with the ground is automatically varied to meet the requirements of the plowing operation. As is clearly shown in Fig. 2, a platform 65 is provided above the driving gearing, upon which platform the operator of the plow can move about for controlling the plowing mechanism and the motor. In the construction shown a seat 66 is provided in suitable position for the operator. Each of the traction bars 41 is provided at its rear end with an upwardly-extending arm 67, to one or more of which arms any agricultural implement may be attached as desired, such as a harrow or planter, for operating in connection with the plow. As will be readily understood, if desired the plow beams 51 can be removed by the withdrawal of the bolts 50, whereupon the machine may be operated as a tractor independently of any plowing operation, in that case the machine or implement to be drawn being attached to two or more of the arms 67. As will be appreciated from an inspection of Figs. 2 and 6, the arrangement of the arms 67 relative to the draft-bars 41 is such that when such arms 67 are used for draft purposes the draft-bars 41 will be forced downward so as to hold the tractor wheels 17 firmly in engagement with the ground, by reason of the fact that the upper ends of the arms 67, to which the implement to be drawn is attached, are adapted to stand at some little distance above the shafts 40 to which the forward ends of the draft-bars 41 are pivotally connected. It will be understood that the arms 67 may be made as long as desired for the purpose of attaining the proper pressure of the wheels 47 upon the ground.

While I have shown my gage wheels held in non-adjustable position forward and back relative to the main framework 10 and have shown the plows as adjustable up and down relative to the gage-wheels through the medium of movement forward and back relative to the draft-bars 41, it will be understood that I do not wish to restrict myself to these particular features, or either of them, except as hereinafter specifically claimed, the important features being that the wheels 47 shall be kept in proper driving relation relative to the motor 27, and that the shares 52 and the wheels 47 may be adjustable up and down relative to each other.

So far as I am aware, I am the first in the art to provide a traction plow in which the machine as a whole is driven through the medium of one or more ground wheels mounted upon or connected with the plow beam or beams, which beams are freely movable up and down relative to the main frame, and the claims are therefore to be construed accordingly.

It will be understood that in a practical embodiment of the machine, ratchets or other differential mechanism will be provided in connection with the driving gearing between each of the drive wheels and the motor,—preferably at the sprocket gear mounted upon the end of the drive wheel shaft,—but inasmuch as such mechanism and its operation are fully understood it has not been deemed necessary to illustrate it herein.

What I claim as my invention and desire to secure by Letters Patent, is—

1. The combination of a frame, a plurality of beams pivotally mounted on said frame and extending rearward therefrom and adapted to be raised and lowered relative thereto, a wheel journaled upon each of said beams, plows adjustable vertically relative to said wheels respectively, traction arms rising from said beams above the axes of the wheels thereon, and means for rotating said wheels for driving the tractor.

2. The combination of a frame, a shaft mounted thereon and extending transversely thereof, means for driving said shaft, a plurality of transversely-extending countershafts arranged out of alinement with each other, means for driving each of said countershafts from said first-named shaft, a plurality of wheels connected with said frame in rear thereof and adapted to rise or fall freely relative to the frame to conform to the surface of the ground as the machine advances, a plurality of plows adjustable vertically relative to said wheels respectively, means for adjusting said plows vertically relative to said wheels, and means for connecting each of said wheels with one of said counter-shafts for driving said wheels.

3. In a tractor, the combination of a frame, a plurality of wheels connected with said frame and adapted to rise or fall freely relative to the frame to conform to the surface of the ground as the tractor advances, means for rotating said wheels for driving the tractor, and a plow connected with each of said wheels adapted by its operation in the ground to cause said wheel to grip the surface of the ground firmly for traction purposes.

4. The combination of a frame, a plurality of plows connected with said frame and adapted to be raised and lowered relative thereto, a plurality of gage-wheels adjustably connected with said plows respectively and adapted to rise and fall therewith, relative to said frame, means for adjusting each of said plows up and down relative to its gage-wheel, and means for rotating said gage-wheels for driving the machine.

5. The combination of a frame, a plurality of draft bars connected with said frame and adapted to swing vertically relative thereto, a wheel journaled on each of said draft bars, means for rotating said wheels for driving the machine, and a plow adjustably mounted on each of said draft bars.

6. The combination of a frame, a plurality of draft bars connected with said frame and adapted to swing vertically relative thereto, a wheel journaled on each of said draft bars, means for rotating said wheels for driving the machine, a plow-beam adjustably mounted on each of said draft bars, and a plow carried by each of said plow beams.

7. The combination of a frame, a plurality of draft bars connected with said frame and adapted to swing vertically relative thereto, a wheel journaled on each of said draft bars, means for rotating said wheels for driving the machine, a pair of links pivotally mounted on each of said draft bars, a plow beam pivotally connected with each pair of links, a plow carried by each of said plow beams, and a lever adapted to hold movable up and down freely relative to the frame, a wheel revolubly mounted on said draft-bar, a plow carried by said draft-bar and movable up and down therewith, and means for rotating said wheel for driving the machine.

11. The combination of a frame, a draft-bar pivotally mounted on said frame and movable up and down freely relative to the frame, a wheel journaled on said draft-bar, a plow-beam pivotally mounted relative to said draft-bar, a plow fixed upon said plow-beam, means for holding said plow-beam in adjusted position relative to said draft-bar, and means for rotating said wheel for driving the machine.

LAUGHLIN M. BUCHANAN.

Witnesses:
MINNIE A. MEIER
M. H. DE BUSK.